June 23, 1959 — C. L. ROBERSON ET AL — 2,891,686
LEVEL INDICATOR AND CONTROLLER
Filed Sept. 9, 1952 — 4 Sheets-Sheet 1

Inventors:
CLETIS L. ROBERSON,
RALPH L. TIEDE.

INVENTORS:
CLETIS L. ROBERSON,
RALPH L. TIEDE.
BY
ATTYS.

United States Patent Office 2,891,686
Patented June 23, 1959

2,891,686

LEVEL INDICATOR AND CONTROLLER

Cletis L. Roberson and Ralph L. Tiede, Newark, Ohio, assignors to Owens-Corning Fiberglas Corporation, a corporation of Delaware Application September 9, 1952, Serial No. 308,558

15 Claims. (Cl. 214—18.2)

This invention relates to level indicators and controllers. While the invention may be used to indicate and control the level of all types of material, whether powdered, granular, liquid, or the like, it is particularly useful for indicating and controlling the level of molten glass as hereafter described. If desired, the invention may be used merely as an indicator.

This application is a continuation-in-part of our application Serial No. 194,150, filed November 4, 1950, which is now abandoned.

Since molten glass is electro-conducting, some of the prior art indicators and controllers comprise an electrical circuit of which a probe member and the melt are parts. When the probe makes contact with the melt, the circuit is completed and the level is thereby indicated.

In practice, such instruments have been found to be objectionable in that volatiles from the glass deposit on the probe or other electrode and frequently short circuit the apparatus. Further, when the glass whose level is being measured is a stiff, viscous one, some of it sticks to the tip of the probe and accumulates after repeated immersions. This prevents an accurate indication of when the actual tip of the probe first reaches the level of the melt.

Pneumatic indicators on the other hand also suffer from several limitations. Customarily, such indicators are made to operate when a probe member has its end sealed by the material forming the level so as to create a back pressure within the member. Thus, contact of a probe member with the glass is again frequently necessary with the same undesirable results. In addition, molten glass and similar fluid materials do not have sufficient rigidity or stable back pressure to withstand without deformation the appreciable force and high pressure of large volumes of gas flow normally employed in such pneumatic indicators. Instead, the yielding surface of molten glass flows away from such strong air jet and leaves a depression or cavity without developing the desired back pressure or without developing such pressure in time to afford an accurate level determination.

Moreover, if the descending probe member does finally become sufficiently sealed to form a back pressure, there is consequent bubbling around the tip. Not only does this condition lead to additional coating of the probe, but it contributes to further erratic and inaccurate level indications.

A leading object of the invention is to provide a level indicator and controller of improved accuracy and sensitivity.

Another object is to provide such an instrument that need not in its operation make actual contact with the material being measured.

A further object is to provide such an instrument that is unaffected in its operation by the properties of the material being measured.

A still further object is to provide such an instrument which is automatic and operable constantly.

A still further object is to provide a pneumatic level indicator and controller that is operable on relatively low gas pressures and small volumes.

Still another object is to provide a pneumatic level indicator which will be unaffected by changes in atmospheric pressures or pressure changes in the space generally surrounding the probe.

An additional object is to provide a level indicator which will take a reading periodically to provide level indications spaced in time, and which will record and hold such indications between readings to permit their utilization for control purposes.

Another and still further object of this invention is to provide a quick-acting, pressure-sensitive detector which will react rapidly with an associated level-seeking probe in taking level readings.

Another object of the invention is to provide a level indicator which will be substantially unaffected in operation by material depositions on the probe subsequent to withdrawal from the level being measured.

The various embodiments of the invention each incorporate a pneumatic tube with one open end as a probe which is adapted to have gas passed therethrough for emission against a material level to be measured. Means are provided for moving each such probe through cycles of movement toward the material level and then away from the level responsive to establishment of a predetermined pressure differential upon movement of the probe into close proximity or in contact with the material. A feature of the invention is that, once the predetermined pressure differential has been established the withdrawal of the probe from the material level is independent of the material itself. Even if material adheres to the probe upon withdrawal, the accuracy of measurement is unaffected and, since the period of reciprocation of the probe may be prolonged in view of the fact that the level reading is registered and held for control purposes, any material adhering to the probe is given sufficient time within which it can be removed by the force of gravity as well as the force of gas blowing therefrom the probe itself.

The probe is ordinarily in the form of a hollow, cylindrical member capable of movement toward and away from the level being measured. A gas, preferably one that is inert with respect to material forming the level, flows through the hollow portion of the member. Usually air is used, but other gases such as nitrogen, carbon dioxide, and the like, may also be employed.

Great sensitivity and improved accuracy have been obtained with a level indicator and controller comprising a hollow elongated member having a closed side tube joined to the member near its tip. Because of the relation between the hollow elongated member or probe and the closed tube of this embodiment, very low pressures and small volumes are needed to operate it. Consequently, the described problems of the prior pneumatic indicators, including the need for actual contact of probe and level, are entirely eliminated.

More specifically, when the indicator or controller comprises, for example, a single hollow member or probe through which the gas flows under pressure, small pressure changes near the probe's tip cannot be detected at a point farther back along the probe because of the pressure drop existing between those two points. In contrast, in this embodiment of the present invention, the closed side tube supplies a static system which is highly sensitive to small changes in pressure. Consequently, when it is stated here and in the claims that the closed tube is joined to the hollow elongated member near its tip or end, a position is contemplated sufficiently near the end of the member where the gas exits to eliminate substantially any appreciable pressure drop between that position and the physical end of the member. It will be apparent that there are a number of such positions for a given hollow elongated member, and that as the position is chosen farther back from the physical end of the member, there is an increasing loss in sensitivity and accuracy. Therefore in designing an indicator of this embodiment, a position may be taken as befits the accuracy desired.

In another embodiment of the invention a hollow, elongated probe member is associated with an open-end auxiliary tube which is arranged for general disposition within proximate vicinity of the probe where it will be subjected to the same general static pressure conditions as those to which the probe is subjected. Level indications of great accuracy have been obtained with relatively low pressures and volumes of gas with this form of the invention by detection of the pressure differential between the probe and auxiliary tube in a pneumatic circuit which is balanced except when the probe comes within the close proximity of the material level to be measured. This embodiment of the invention proves particularly advantageous under conditions of measurement in which the atmosphere in which the level to be measured is isolated or segregated from the general atmosphere so that the material is subjected to a different static pressure from that of the general atmosphere, or under those conditions in which the atmosphere surrounding the probe is of changing nature, such as is frequently encountered in high-temperature glass melting operations.

It is to be noted that when pressure variations occurring within a confined space are to be detected by a pneumatic detector balanced against atmospheric pressure, changes in such atmospheric pressure, or changes in static pressure within the confined space, will lend to inaccuracies in probe position indications and consequently inaccuracies in level indications as well. Thus, in the second embodiment of the invention in which the pneumatic circuit is balanced by pressures in the immediate vicinity of the probe and itself, such inaccuracies are eliminated.

In still another embodiment of this invention, the pressure differential between parts of a Venturi section associated with a single tubular probe is utilized to determine the level of material being measured. In this arrangement, the pressure differential established by reason of a change in the volume of the gas passing through the probe provides a condition change for actuation of a pressure-sensitive device indicating the proximity of the probe to the material level. Like the arrangement of the second embodiment, the pneumatic circuit of his embodiment is unaffected in accuracy by atmospheric pressure changes in view of the fact that the differences in pressure measured within the probe are balanced against each other rather than against atmospheric pressure.

The novel features which we believe to be characteristic of our invention are set forth with particularity in the appended claims. Our invention, however, as to its organization, manner of construction and method of operation, together with further objects and advantages thereof may be best understood by reference to the following description taken in connection with the accompanying drawings, in which:

Figure 1:
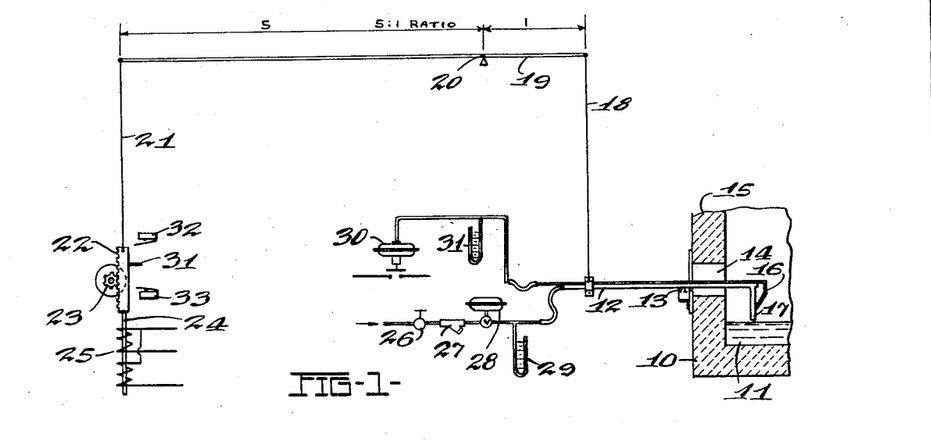
Figure 1 is a schematic drawing showing mechanical and air connections in the first embodiment of the invention.
Figure 2:
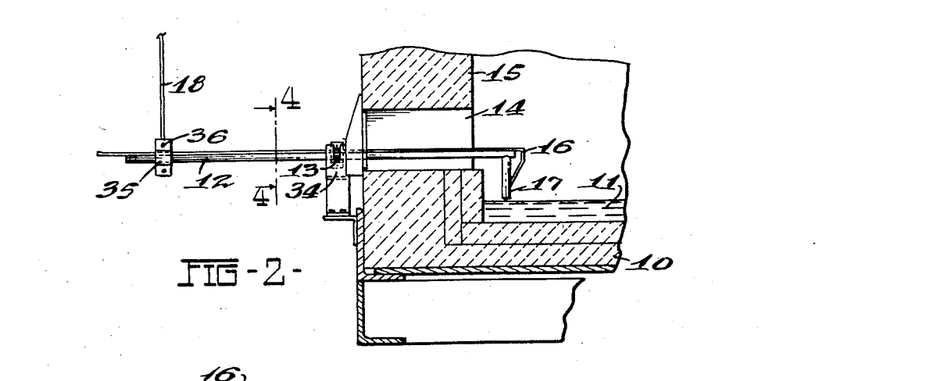
Figure 2 is an enlarged elevational view of the probe embodied in the apparatus of Figure 1 showing its position in a wall section of a glass melting tank.

Referring to Figure 1, and in part to Figure 2, a glass melting tank 10 contains a pool of molten glass 11. A probe 12 having the form of a lever of the first class with a fulcrum at 13 passes through an opening 14 in the wall 15 of the tank to reach the glass. Physically associated with the probe is a closed tube 16 which communicates with the interior of the probe at a point 17 near its tip. The close relation and relatively small size of the probe and tube make the utilization of the present invention very simple and convenient. The other end of the probe is linked by a suitable member 18 to another first class lever 19 having a fulcrum 20. The free end of the second lever is joined to a shaft member 21 having a gear rack 22. The rack is suitably contacted as by a pinion 23 driven by a reversible motor M illustrated in the the circuit of Figure 5. Connected to the gear rack is an armature 24 cooperating with a transmitter 25 to send an electrical impulse to the recorder as hereafter illustrated in Figure 5.

In operation, air under pressure is admitted through the valve 26 and passes through a filter 27, a pressure regulator 28, and then to the hollow probe 12 by way of a flexible hose which allows for the constant vertical movement of the probe. If desired, a manometer 29 may be used to observe the pressure of the entering air.

Assuming the downward movement of the probe as the starting point of its motion cycle, the flow of air from the tip of the probe is restricted as the tip approaches the glass level. This causes a pressure increase within the probe. The pressure within the closed tube 16, being static, is sensitive to such pressure changes in the probe and accordingly acts as an instantaneous sensing medium, quickly reflecting any pressure increase as an impulse on the diaphragm control 30. This pressure may be indicated by a manometer 31. The impulse expands the diaphragm causing an electrical circuit to close which activates means to record the position of the probe and reverse its vertical direction of travel. This motion originates when the motor 23 raises the rack 22 and is transmitted to the probe through the lever 19.

The probe continues to rise as the shaft member 21 rises until a finger 31 on the rack 22 trips a limit switch 32 which by circuits hereafter described reverses the vertical direction of movement of the shaft 21 and therefore the probe as well. Hereafter the cycle as described is repeated. If the pneumatic system of the present invention should fail, or if the glass level should fall below the range of the indicator, the finger 31 trips the limit switch 33 which halts the entire operation as hereafter described.

With particular reference to Figure 2, the fulcrum 13 of the probe is supported by side panels 34 located substantially on a level with the opening 14 and in outside contact with the wall 15. A collar 35, clamped to the external end of the probe, is pivotally connected at 36 with the linking member 18.

Figure 3:
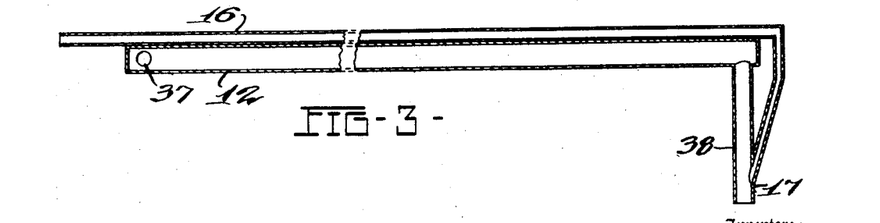
Figure 3 is a longitudinal, vertical section of the probe shown in Figure 2.

The probe 12 as illustrated in Figure 3 preferably comprises a hollow cylindrical conduit having an entrance tube 37 for the admission of the gas and an exit tube 38 directed toward the glass level for the discharge. The auxiliary closed tube 16 is superposed on the probe 12 and communicates with its interior near the end or tip of the probe as with the exit tube at the point 17.

Figure 4:
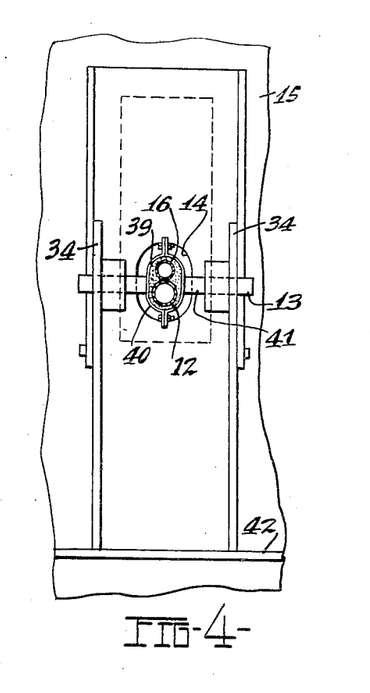
Figure 4 is a transverse vertical section of the probe of Figure 2 as taken on lines 4—4.

The probe and closed tube are preferably made from a metal resistant to molten glass such as platinum, platinum-rhodium alloys, platinum-nickel alloys, and the like. It is also desirable to insulate these members from the clamping means which encircles the probe and closed tube and forms the fulcrum. For instance, in Figure 4 the probe 12 and tube 16 are wrapped with leached glass fibers 39 or other high temperature resisting insulation to avoid direct contact with the clamp 40. Leached fibers of the type disclosed in Patent No. 2,461,841 to Nordberg may be used, for example. The clamp is part of an axle 41 which is journaled for rotation in the slots of the side panels 34. The panels are supported on a bottom plate 42.

Figure 5:
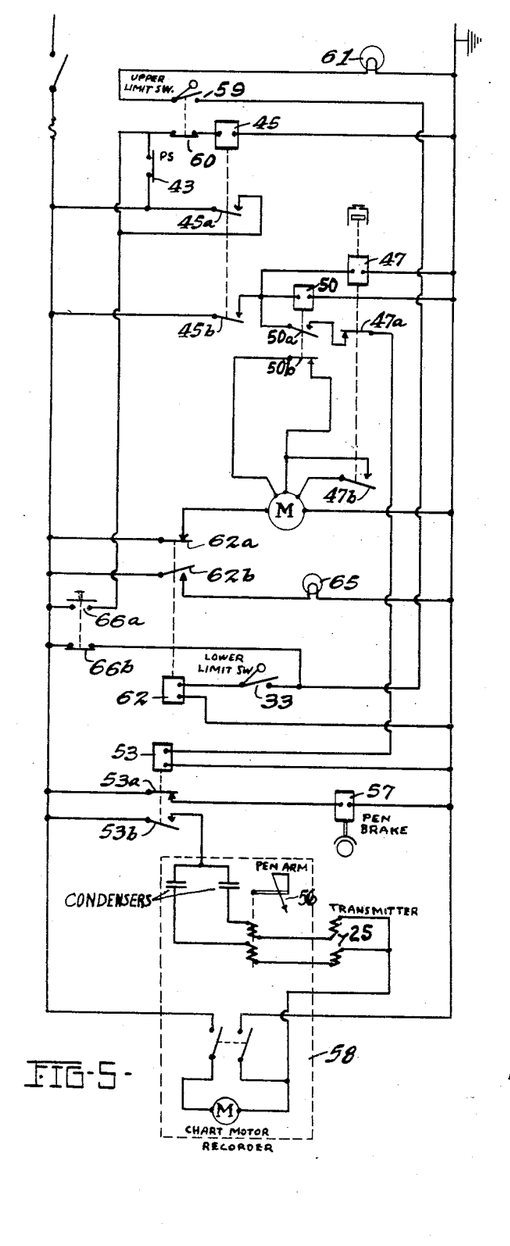
Figure 5 is a wiring diagram of the electrical circuit involved in operating each embodiment of this invention.

With respect to the operation of the circuits shown in Figure 5, the following list relates in chronological order the reactions that take place. The probe is continuously cycled, the recording of the level taking place when the probe tip reaches the bottom of its vertical stroke. The description of this motion cycle begins with the probe descending.

(1) When the static closed tube 16 transmits an impulse to the diaphragm control 30 responsive to the probe tip reaching the level being measured, the diaphragm control closes a pair of pressure switch contacts 43 shorting out a normally open holding contact 45a of a relay 45 which then becomes energized, thereby closing the contact 45a to hold relay 45 energized until contact 60 is opened as later described.

(2) The normally open contact 45b of the relay 45 then closes energizing (a) A conventional time-delay relay 47 (such as an electro-pneumatic type time-delay relay) having a normally closed contact 47a, and a normally open contact 47b;

(b) A relay 50 having a normally open contact 50a, and a normally closed contact 50b; and (c) The relay 53 which is actuated through the contact 50a and has a normally closed contact 53a and a normally open contact 53b.

As a result of the closure of contact 45b of relay 45, the motion of the probe is stopped and the probe comes to rest. The time-delay relay 47 provides a time delay after its energization and before actuation of its contacts during which the recorder operates to position itself for a recording. Between level recordings the recorder pen is locked and held in the position established by the measured level by means of a brake pad attached to the armature of a single pole midget relay 57 to prevent movement of the pen due to ambient vibration.

(3) Thus, when relay 53 is energized, contact 53a opens interrupting the pen brake relay 57 and releasing the pen 56.

(4) At the same time, contact 53b closes energizing a conventional recording circuit contained within the dotted rectangle 58 which records at that instant the vertical position of the tip of the probe, which then corresponds to the level, on suitably calibrated paper. In the illustrated circuit a series resonant bridge is used in cooperation with the armature 24 and transmitter 25 to effect the recording (see Figure 1). However, other standard recording circuits may be used as well.

(5) Shortly after the recording is made, the time delay relay 47 completes its time delay after energization and the normally closed contact 47a opens.

(6) Contacts 53a and 53b then revert to their normal positions, locking the pen brake again and deenergizing the resonant bridge of the recording circuit.

(7) Completion of the time delay provided by relay 47 also results in reversal of rotation of motor 23 through contact 47b, since relay 50, in having initially been energized when contact 45b closed, has contact 50a closed and contact 50b open awaiting termination of the time delay. The probe tip is now raised.

(8) Relay 45 remains energized through contact 45a as the probe rises until the upper limit switch 32 is actuated by the finger 31 on the gear rack 22 as shown in Figure 1.

(9) Switch 32 has one normally open contact 59 and one normally closed contact 60. When the switch is tripped, contact 59 closes lighting a pilot light 61 which remains lit until the probe descends and the switch 32 is released.

(10) Actuation of switch 32 also opens contact 60 resulting in deenergization of relay 45. Contact 45b thereupon returns to its normal open position, deenergizing the time-delay relay 47 and relay 50.

(11) Contact 50b of relay 50 thereupon returns to its normally closed position and contact 47 by its normally open position, causing the motor 23 to reverse its direction of rotation, and the member 21 and probe 12 to descend once more.

To summarize the cyclic operation briefly, the probe moves downwardly toward the glass level to a point where the back pressure offered by the glass is sufficient to actuate the pressure switch 30 associated with the closed auxiliary tube 16. This causes a momentary halt and then a reversal of movement of the probe to withdraw it from the glass level to a point where it actuates the limit switch 32. Such actuation causes another reversal of movement in a downward direction for the succeeding cycle of reciprocation. A glass level reading is taken during the momentary halt in movement of the probe before withdrawal from the glass. Such reading is recorded and held until a next succeeding reading is taken.

If the glass level should fall below the range of the instrument or should the pneumatic system fail, the probe and shaft member 21 during the descent phase of the motion cycle continue in their descent until the finger 31 on the gear rack 22, Figure 1, strikes the lower limit switch 33.

A. This switch when closed energizes a motor-control relay 62 having a normally open contact 62b and a normally closed contact 62a.

B. Contact 62b now closes lighting a red warning pilot light 65, while contact 62a opens stopping the motor 23 and halting the whole operation.

C. If the operator wishes to check the operation of the apparatus upon noting the red light, he depresses a push button having a normally closed contact 66b and a normally open contact 66a. When contact 66b opens, relay 62 is deenergized; when contact 66a closes, relay 45 is energized. This allows the instrument to pass through another motion cycle ending with the same result if there has indeed been a failure in the pneumatic system or the glass level has fallen below the range of the instrument.

In the latter case, the mechanical linkages or arm ratios of the levers of the instrument need only be altered in order to reach and measure the new low level if it is decided to operate the melting unit at this new low level.

A master switch 68 and fuse 69 may be included in the circuits as shown.

It is to be noted that the probe arrangement described is such that control of motion of the probe 12 is turned over to the electrical circuit once the pressure-switch contacts 43 are operated, thereby assuring that the level measurement is unaffected by matter clinging to the probe, or by disturbances on the surface of the level measured. Responsive to operation of the pressure-switch contacts 43, relay 45, which has its own holding contacts 45a, is energized to withdraw the probe 12 until the upper limit switch 59 is actuated to deenergize relay 45. With deenergization of relay 45 the directional relay 50 is also deenergized thereby closing contacts 50b thereof to cause the motor M to advance the probe to the material level.

Operation of the Fisher-Porter recording equipment has been modified to the extent of incorporating the pen brake 57 which locks the pen arm 56 in the position of a reading each time that a new reading is taken to indicate the position of the probe when it reaches the material level being measured. Since the probe position is recorded by the pen arm 56 and held by the pen brake 57 throughout the cycle of withdrawal and advancement of the probe, position readings may be advantageously utilized to control the introduction of batch to the glass melting tank, without consideration as to whether material might be deposited at the probe tip.

In view of the fact that the probe condition between readings or measurements does not in any way affect the recording equipment makes it possible to provide adjustment for the period of motion of the probe away from and toward the material level to permit natural removal of any deposition around the probe under the action of gravity and the blowing of gas therethrough. Such adjustment may be made by positioning of the upper limit switch 32 or by varying the speed of motor 23. If the material collected on the probe is viscous in nature, it may require a longer period of time to effect the removal of the matter before a subsequent reading is to be taken. Conversely, if a more fluid material is being measured, the period of motion of the probe may be reduced, thereby allowing a greater number of readings to be taken within a given time.

Because of the construction of the present invention, the indicator or controller is very sensitive and, further, operable at low gas pressures and small volumes. Moreover, the present electrical circuits eliminate any need for a constantly maintained pressure within the pneumatic system. Therefore, the described faults found with prior instruments are not met in an indicator or controller of this invention.

The present invention as described may be used so as to avoid all contact with the level or to make only a slight contact depending principally upon the sensitivity provided by the relative positions of the physical end of the probe and the point where the closed tube communicates with the probe. If a stiff viscous glass or other material capable of some stable back pressure forms the level being measured, the gas pressure within the probe may be increased somewhat to magnify the effect on the closed tube.

In this case, just a close approach of the probe to the level is needed to counteract the effect of the air flow and restore a lesser subatmospheric or atmospheric pressure within the closed tube. When this happens, the circuits can be made to operate in the same manner as previously disclosed.

When it is desired to use the present invention as a level controller as well as an indicator, suitable activating means are included to operate other means which supply, for instance in the case of a glass melting unit, additional raw batch. As an example, a predetermined minimum level recording may be used to energize a relay which closes a circuit containing a conventional motor. The latter operates a feeder such as an Archimedean screw which advances the batch into the melting unit. When a level above the predetermined minimum is restored, the circuit is broken and the motor stops.

Figure 6:
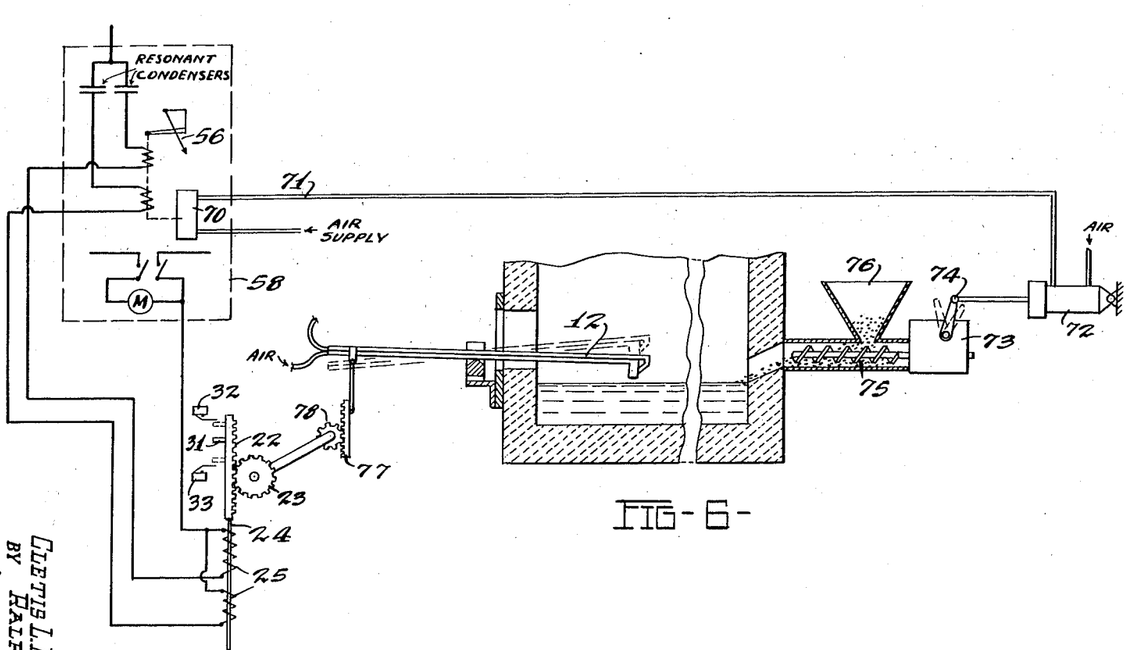
Figure 6 is a schematic diagram showing a melting tank and level-detecting probe plus associated control apparatus for introducing batch material to the melting tank responsive to and dependent upon the level indications provided by the probe and associated recording apparatus.

A highly efficient level control arrangement is possible with the described apparatus, however, in that position signals may be provided for with conventional recording equipment such as the Fisher-Porter recorder used in the first embodiment. A pneumatic pressure controller 70 actuated by the pen 56 is incorporated in this recorder which provides pneumatic pressure signals proportional to the position taken by the pen arm. The air supplied to the controller is fed over a supply line 71 which, for example, may have pressure signals supplied thereover in the range of 3 to 15 pounds per square inch depending upon the recording position of the pen arm 56. These signals are introduced to a piston air operator 72 which actuates a lever arm 74 on a vari-speed drive 73 which may comprise an electric motor or any of a large number of variable speed devices. The positioning of the lever arm 74 controls the speed of rotation of the drive 73 which operates the screw feed mechanism 75 feeding batch from the hopper 76. The apparatus is so adjusted that when the probe 12 indicates and records a low-level reading, the corresponding positioning of the pen arm 56 causes a high pressure signal to adjust the drive 73 for high speed operation resulting in the feed screw 75 introducing batch to the melting tank at a relatively rapid rate. When the level reading is high, approaching a predetermined desired level, the corresponding pressure signal in air line 71 is low, thereby adjusting the feed screw drive 73 so that batch is introduced into the melting tank at a relatively slow rate. In other words, a low level in the glass melting tank is compensated for by feeding batch to the tank at an increased rate which gradually diminishes until the desired level is reached, after which the probe continues its reciprocating operation to take intermittent readings in order to introduce batch to the tank at a rate just sufficient to maintain the desired level. To raise and lower the probe, it may be connected to the rack 22 and pinion drive 23 through a second rack 77 and pinion 78 of reduced size instead of through the lever arrangement shown in the embodiment of Figure 1.

Variability in the rate of batch feed may be adjusted to extend over a range from zero on up. Under certain conditions, however, such as when the screw feed apparatus is disposed in proximity to extremely high temperatures such as that in a glass-melting tank, it may be desired to prevent the feed screw from reaching a standstill because the resulting high temperatures to which it would be subjected might be damaging. Thus, it is contemplated that the feed screw 75 may be allowed to turn at a rate sufficient to introduce batch to the melting tank at a rate such that the screw will not become overheated, yet at a sufficiently slow rate that the level of material being controlled is substantially unaffected.

Figure 7:
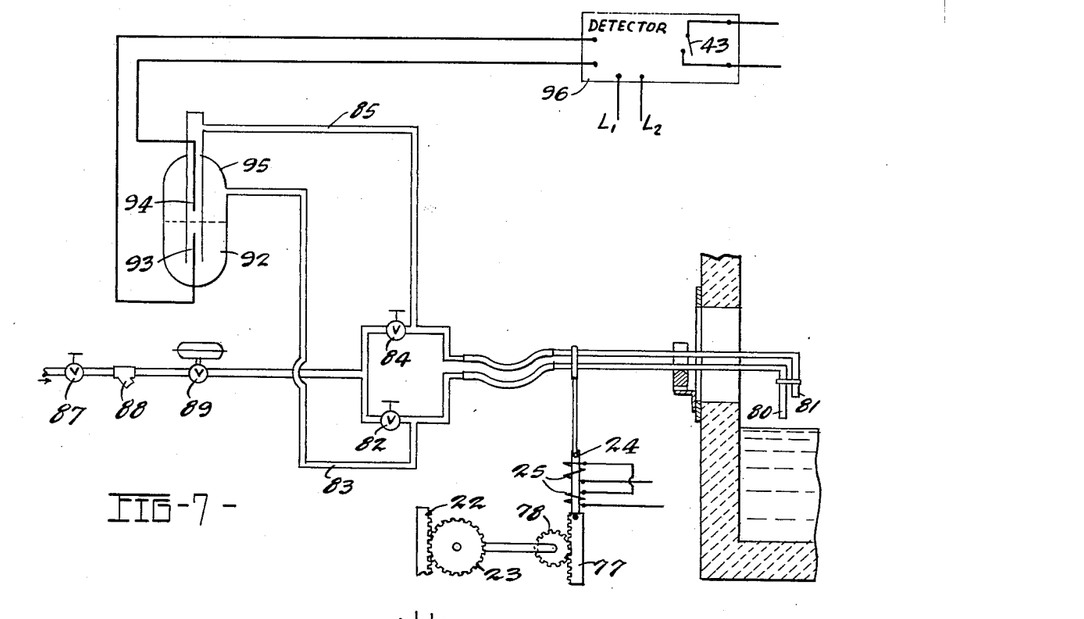
Figure 7 is a schematic diagram showing mechanical, electrical, and air connections, as well as probe structure of a second form of the invention.

In the second embodiment of the invention shown in Figure 7, an open-end probe 80 is utilized in association with an open-end auxiliary tube 81. Both the probe and its auxiliary tube are supplied with air from a common source through a control valve 87, strainer 88, and a pressure regulator 89 from which the air is in turn supplied over two paths leading to the probe and auxiliary tube and controlled by individual needle valves 82 and 84, respectively. The air paths leading to the probe and auxiliary tube are provided with branches 83 and 85 respectively, both of which are introduced to an electrical manometer 95 which envelops a quantity of electro-conducting liquid 92. The tube branch 85 leading from the auxiliary tube 81 is introduced into the manometer so that the end thereof is disposed below the electro-conducting liquid while the branch 83 of the air path from probe 80 is introduced into the manometer at a point above the level of the confined liquid. A pair of spaced electrodes 93 and 94 are disposed within the end portion of the tube branch 85 which projects down into the liquid 92. The electrodes are disposed so that the liquid within the manometer is normally in contact with the lower electrode 93 but not in contact with the upper electrode 94.

The electrodes are connected for operation of an electrical detector 96 which in turn is suitable for operation of the switch contacts 43 of the electrical circuit of Figure 5. The envelope for the liquid 92 is large in comparison to the end of the branching tube 85 within which the electrodes are disposed so that when pressure is increased within the probe branch 83 responsive to probe 80 reaching the material level, the back pressure of the material acts to lower the level of the liquid 92 to force it upward within the tube of branch 85, thereby completing the electrical circuit for actuation of the detector 96. An advantage of this type of manometer is that pressure differentials between the probe and auxiliary tube can be detected rapidly since the level within the smaller tubular member or branch 85 rises considerably faster than the fall of the level in the envelope 95 by reason of the difference in cross-sectional areas of the two members.

Upon closure of the switch contacts 43, the reversible motor M, Figure 5, which drives the pinion 23 and rack 22 acts to withdraw the probe from the glass level, thereby returning the pneumatic circuit to a balanced condition until the material-level reading is again to be taken during the next cycle of motion of the probe.

This embodiment of the invention has the advantage that it is unaffected by variations in pressure conditions either within proximity of the probe itself or by variations in atmospheric pressure. Atmospheric pressure plays no part in the pneumatic circuit in that nowhere is the pressure within the tube balanced against atmospheric pressure. Since the pressures within the probe 80 and the auxiliary tube 81 are balanced against each other, and the ends thereof are in close proximity to each other so that both are subjected to the same general static pressures, any variations in such static pressures fail to have effect on the balance of pressures in the manometer. Thus, this embodiment is particularly desirable for measurement of the level of volatile materials such as high temperature glass which tend to affect pressure conditions in the space above the level.

It is to be noted that the auxiliary tube 81 is not necessarily limited to being mounted upon the probe 80, and need not be moved therewith, but may be mounted in fixed position within sufficient proximity to the space within which the probe 80 is located that it would be subjected to the same static pressure conditions as those to which the probe is subjected.

Figure 8:
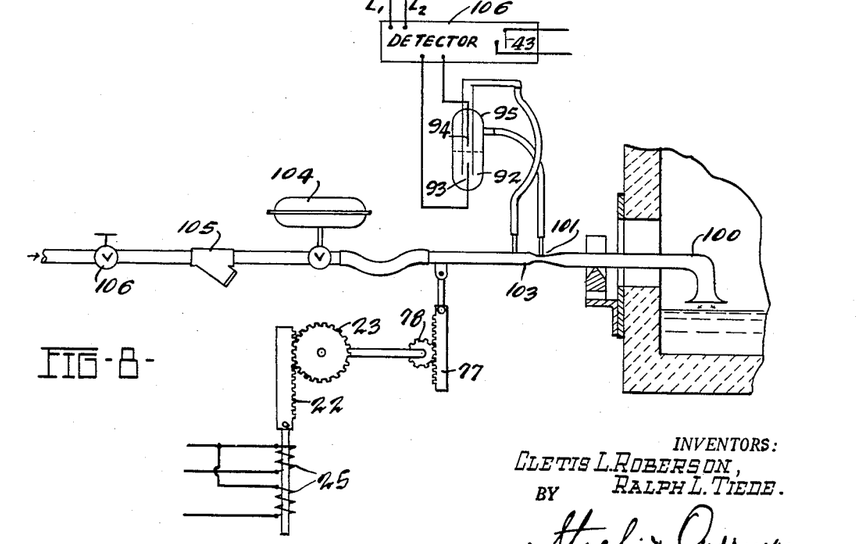
Figure 8 is a schematic diagram showing mechanical, air and electrical connections, as well as probe structure of a third form of the invention.

In the third embodiment of this invention, as shown in Figure 8, a tubular probe 100 provided with a Venturi section 103 is utilized for level measurement. The probe is supplied with air through a control valve 106, strainer 105, and a pressure regulator 104 through the Venturi section 103 of the probe to the end thereof from which it is directed against the material level to be measured.

The manometer used in detecting the pressure differential at the Venturi section may be of the type used in connection with the second embodiment shown in Figure 7, or any other sensitive manometer which is sufficiently sensitive to detect the difference in pressure between the small and large sections of the Venturi section and which is also adaptable to actuation of the switch contacts 43 of the electrical circuit associated with the probe to affect its reciprocal movement. The probe is supported at the edge of the melting tank where a fulcrum is provided by the support, while the inlet end of the probe is suitably linked to the gear rack 22 which is contacted by the pinion 23 driven by the reversible motor M. Probe positions corresponding to material level readings are indicated by the transmitter 25 which sends an electrical impulse to the recorder depending upon the position of the armature 24 cooperating with the gear rack, in the manner described for operation of the arrangement of the first embodiment shown in Figure 1.

With the normal flow of gas through the probe, the dynamic head is greatest at the constriction 101 of Venturi 103 with a consequent smaller static head transmitted to the associated manometer. The liquid level in the envelope is consequently high under these conditions, thus causing the gap between electrodes 93 and 94 to remain open without energizing detector 106. As soon as the end of the probe reaches the material level being measured, however, the flow of gas through the probe is restricted and the static head at the constriction 101 is correspondingly increased. The pressure introduced to the manometer as a result of this increase in static pressure acts to lower the liquid level in the envelope 95 of the manometer and thereby raises the level of the electro-conducting liquid 92 within the end of the tube 102. A rise of liqud level in this branch causes a closure of the gap between electrodes 93 and 94, thereby energizing detector 106 and closing contacts 43. As in the first and second embodiments of the invention, closure of the contacts 43 results in operation of the reversible motor M to withdraw the probe 100 to a given point in preparation for another advance thereof toward the material level for a subsequent recordation of the material level.

This embodiment has the advantage of requiring but a single pneumatic tube for the probe as well as the advantages of a closed pneumatic circuit balanced against the pressures within the probe itself rather than external atmospheric pressures. This arrangement is therefore independent of variations in atmospheric pressure as well as substantially all but extreme variations of static pressure within the vicinity of the probe.

Although the ends of the probes in the first and second embodiments of the invention are shown to be straight cylindrical portions, it has been found advantageous to make such ends with a flared shape such as shown in Figure 8. With such a shape, gases emitted from the probe end are emitted over a greater area, thereby resulting in a lower pressure of such gas over each square inch of material against which it is directed with a consequent reduction in the occurrence of turbulence or bubbling of the material when the probe comes in close proximity thereto. Still another advantage of a flared shape at the end of the probe is the reduction of material adhesion thereto in comparison to the amount of material adhering to a straight cylindrically-shaped probe. It is to be understood that the flared probe may be interchanged with the straight cylindrically-shaped probe in any of the embodiments of the invention, although only the third embodiment shown in Figure 8 illustrates such a probe.

While we have shown a number of specific embodiments of our invention, it will, of course, be understood that various details of construction may be varied through a wide range without departing from the principles of the invention, and, therefore, it is contemplated that the appended claims cover all such modifications as fall within the true spirit and scope of the invention.

We claim:

1. Level-measuring apparatus comprising a pneumatic probe adapted for the passage of gas therethrough under pressure, means for cyclically advancing and withdrawing said probe to and from a given material level, pressure-sensitive means actuable responsive to the change in pressure within said probe upon restriction of gas flow therethrough, and means for noting the position of said probe at the time of actuation of said pressure-sensitive means responsive to the restriction of gas flow through said probe when said probe reaches said material level, and means for retaining the noted position of said probe at the time of actuation until the next succeeding actuation of said pressure-sensitive means.

2. Level-measuring apparatus comprising an open end pneumatic probe adapted for passage of gas therethrough under pressure, means for cyclically advancing the open end of said probe to a given material level, pressure-sensitive means actuable by the pressure change within said probe responsive to a restriction of gas flow therethrough, means for noting the position of said probe end at the time of actuation of said pressure-sensitive means when said probe end reaches said material level, and means responsive to actuation of said pressure-sensitive means for withdrawing said probe end to a given point and reinitiating said advancing means.

3. Level-measuring apparatus comprising a pneumatic probe adapted for the passage of gas therethrough under pressure, means for periodically advancing said probe in the direction of a given material level, pressure-sensitive means actuable responsive to the different pressure within said probe upon restriction of gas flow therethrough, means for noting the position of said probe at the time of actuation of said pressure-sensitive means, means for withdrawing said probe responsive to actuation of said pressure-sensitive means when said probe reaches said material level, and means for again advancing said probe towards said level upon its withdrawal to a given position above said level.

4. Level-measuring apparatus comprising a pneumatic probe for the passage of gas therethrough under pressure, means for advancing and withdrawing said probe to and from a given material level, an auxiliary tube pneumatically connected with said probe for detecting the static pressure of gases passing therethrough, pressure-sensitive means actuable responsive to the change in pressure within said auxiliary tube upon restriction of gas flow through said probe, and means for noting the position of said probe upon actuation of said pressure-sensitive means responsive to the restriction of gas flow through said probe when said probe reaches said material level.

5. Level-measuring apparatus comprising a pneumatic probe adapted for the passage of gas therethrough under pressure, means for cyclically advancing and withdrawing said probe to and from a given material level, a Venturi section incorporated in said probe, pressure-sensitive means pneumatically connected with said Venturi section to detect the pressure changes in said probe, control means actuable responsive to detection by said pressure sensitive means of the pressure change within said probe when it reaches said material level, and means for noting the position of said probe at the last preceding actuation of said control means.

6. Level-measuring apparatus comprising a pneumatic probe adapted for the passage of gas therethrough under pressure, means for advancing and withdrawing said probe to and from a given material level, an auxiliary tube adapted for passage of gas therethrough under pressure to simulate the normal pressure conditions in the vicinity of said probe, pressure-sensitive means actuable responsive to establishment of a pressure difference between said probe and auxiliary tube upon restriction of gas flow through said probe, whereby said pressure-sensitive means is actuated when said probe reaches said material level.

7. Level-measuring apparatus comprising a level-seeking probe adapted for the passage of gas under pressure therethrough against a given material level, a second tube for the passage of gas therethrough under pressure to establish a reference pressure level, means for balancing the pressure of gases in said tubes each against the other, means for advancing said level-seeking probe in the direction of said level, means for detecting the pressure differential between said tubes when said level-seeking probe reaches said level, means for withdrawing said level-seeking probe to a given position above said level responsive to detection of such pressure differential, and means for again advancing said probe toward said level upon reaching said given position above said level.

8. Level-measuring and control apparatus comprising a level-detecting probe, means for cyclically advancing and withdrawing said probe to and from a given material level, means for indicating the position of said probe upon its reaching said material level, and means for variably feeding matter to the body of material being measured, said indicating means including signal means for providing signals proportional to indicated probe positions, said feeding means being responsive in accordance with said signals to selectively establish a rate and the period of feed of matter fed to the body of material being measured.

9. Level-measuring and control apparatus comprising a pneumatic probe for the passage of gas therethrough, means for cyclically advancing and withdrawing said probe to and from a given material level, pressure-sensitive means actuable responsive to the pressure within said probe upon restriction of gas flow therethrough when said probe reaches said material level, means for detecting the position of said probe upon actuation of said pressure-sensitive means, signal means associated with said detecting means for supplying signals in accordance with said probe position, means for continuously feeding matter to the body of material measured, and control means responsive to said signals for governing the rate of introduction of matter by said feeding means, said control means being arranged to selectively establish a rate and a period of feed of matter which are proportional to the distance of said probe from a predetermined desired level of said material upon actuation of said pressure-sensitive means.

10. A pneumatic level indicator comprising an open end hollow probe, means for passing a gas through the probe, a closed auxiliary side tube communicating with the interior of the probe near its tip, means for cyclically reciprocating said end to and from the surface level to be measured, and means pneumatically connected with the probe for indicating surface level responsive to the pressure change in the tube upon said end reaching the surface.

11. A pneumatically operated level indicator comprising a probe composed of a hollow elongated member, means for passing a gas through the member, a closed subsidiary tube communicating with the interior of the member near its exit end, means for advancing the exit end of the member toward a surface level to be measured, means responsive to changes in pressure in the tube to withdraw said end to a given point from said level upon the end reaching said level, and automatic means for initiating operation of said advancing means to move said exit end toward the level after reaching said point.

12. A level indicator comprising a hollow probe comprising a hollow elongated member, means for causing movement of the probe toward and away from the level, means for flowing a gas through the member, a closed side tube arranged for movement with the member and communicating with it near the end of the member, means responsive to changes in gas pressure within the tube to control said movement of the probe, and means to record the position of the probe at a desired time.

13. A level indicator comprising two levers of the first class, linked together at one end, one lever comprising at least two tubes, means for flowing a gas through one tube, another tube being closed at one end and joined to the gas-conducting tube near its tip, a shaft connected to the free end of the second lever, and means responsive to pressure changes within the closed tube to raise and lower the shaft whereby the levers are correspondingly operated, said means including recording means to indicate the vertical position of the tip of the first lever at a desired point in its motion cycle.

14. In conjunction with a container of material, a level indicator comprising a vertically reciprocating first-class lever having its fulcrum positioned in the container wall, said lever comprising two tubes substantially parallel throughout their lengths, means for supplying air under pressure to one tube, the other tube being closed at one end and communicating by its other with the interior of the first tube at a point near its tip to form a common end which is directed toward the level of the material, a second first-class lever linked to the other end of the first lever, a shaft connected to the free end of the second first lever, means responsive to pressure changes within the closed tube to raise the shaft, electrical means to reverse the direction of the shaft at a predetermined point in its upward travel, and recording means to indicate the vertical position of the tip of the first lever with respect to the container floor at the lowest point of the lever's vertical motion cycle.

15. A level indicator as claimed in claim 14 wherein the material is molten glass, electrical means positioned to operate when a predetermined point in the shaft's travel is reached, means responsive to the operation of said electrical means to halt the entire operation of the indicator.

References Cited in the file of this patent

UNITED STATES PATENTS

| | | |
|---|---|---|
| 1,961,893 | Wadman et al. | June 5, 1934 |
| 1,977,969 | McIntosh | Oct. 23, 1934 |
| 2,398,958 | Pellettere | Apr. 23, 1946 |
| 2,513,374 | Stead et al. | July 4, 1950 |
| 2,564,527 | Fortier | Aug. 14, 1951 |
| 2,613,443 | Helmick | Oct. 14, 1952 |
| 2,692,498 | Knobel | Oct. 26, 1954 |
| 2,737,807 | Brichard | Mar. 13, 1956 |

FOREIGN PATENTS

| | | |
|---|---|---|
| 874,659 | France | May 18, 1942 |